US012782616B2

(12) United States Patent
Luo et al.

(10) Patent No.: US 12,782,616 B2
(45) Date of Patent: Nov. 3, 2026

(54) INKJET INKS FOR DEPOSITION AND REMOVAL IN A LASER DICING PROCESS

(71) Applicant: Applied Materials, Inc., Santa Clara, CA (US)

(72) Inventors: Yingdong Luo, Newark, CA (US); Kangkang Wang, San Jose, CA (US); Wei-Sheng Lei, San Jose, CA (US); Xiaopei Deng, San Jose, CA (US); Erica Chen, Cupertino, CA (US); Kang Luo, San Jose, CA (US); Daihua Zhang, Los Altos, CA (US); Rami Hourani, Santa Clara, CA (US); Ludovic Godet, Sunnyvale, CA (US)

(73) Assignee: Applied Materials, Inc., Santa Clara, CA (US)

( * ) Notice: Subject to any disclaimer, the term of this patent is extended or adjusted under 35 U.S.C. 154(b) by 632 days.

(21) Appl. No.: 18/173,365

(22) Filed: Feb. 23, 2023

(65) Prior Publication Data

US 2023/0273355 A1 Aug. 31, 2023

Related U.S. Application Data

(60) Provisional application No. 63/268,504, filed on Feb. 25, 2022.

(51) Int. Cl.
*G02B 5/18* (2006.01)
*B23K 26/402* (2014.01)
(Continued)

(52) U.S. Cl.
CPC .......... *G02B 5/1847* (2013.01); *B23K 26/402* (2013.01); *B23K 26/60* (2015.10); *G02B 1/14* (2015.01)

(58) Field of Classification Search
CPC ...... G02B 5/1847; G02B 1/14; B23K 26/402; B23K 26/60
See application file for complete search history.

(56) References Cited

U.S. PATENT DOCUMENTS 8,048,696 B2 11/2011 Shiue et al.
10,763,124 B2 9/2020 Harikai et al.
(Continued)

FOREIGN PATENT DOCUMENTS

CN 112820637 A 5/2021
EP 3882959 A1 9/2021
(Continued)

OTHER PUBLICATIONS

International Search Report / Written Opinon issued to Patent Application No. PCT/US2023/063124 on Jun. 23, 2023.
(Continued)

*Primary Examiner* — James M Mellott
(74) *Attorney, Agent, or Firm* — Patterson + Sheridan, LLP

(57) ABSTRACT

Methods of dicing optical devices from an optical device substrate are disclosed. The methods include disposing a protective coating only over the optical devices. The optical device substrate includes the optical devices disposed on the surface of the optical device substrate with areas therebetween. The areas of the optical device substrate are exposed by the protective coating. The protective coating includes a polymer, a solvent, and an additive. The methods further include curing the protective coating via a cure process so that the protective coating is water-soluble after the solvent is removed by the cure process, dicing the optical devices from the optical device substrate by projecting a laser beam to the areas between the optical devices, and exposing the
(Continued)

protective coating to water to remove the protective coating from the optical devices that are diced.

17 Claims, 4 Drawing Sheets

(51) Int. Cl.
*B23K 26/60* (2014.01)
*G02B 1/14* (2015.01)

(56) References Cited

U.S. PATENT DOCUMENTS

| | | | |
|---|---|---|---|
| 2018/0342422 A1 | 11/2018 | Li et al. | |
| 2019/0157100 A1* | 5/2019 | Harikai | H01L 21/30655 |
| 2019/0371669 A1 | 12/2019 | Karasaki et al. | |
| 2020/0357654 A1 | 11/2020 | Harikai et al. | |

FOREIGN PATENT DOCUMENTS

| | | |
|---|---|---|
| KR | 20160092659 A | 8/2016 |
| WO | 2009145526 A2 | 12/2009 |

OTHER PUBLICATIONS

Extended European Search Report Dated Jan. 28, 2026 For Application No. 23760915.1.

* cited by examiner

INKJET INKS FOR DEPOSITION AND REMOVAL IN A LASER DICING PROCESS

CROSS-REFERENCE TO RELATED APPLICATIONS

This application claims benefit of U.S. Provisional Patent Application No. 63/268,504, filed Feb. 25, 2022, which is herein incorporated by reference in its entirety.

BACKGROUND

Field

Embodiments of the present disclosure generally relate to optical devices. Specifically, embodiments of the present disclosure relate to methods of laser dicing optical devices with a protective coating, and a protective coating for laser dicing optical devices.

Description of the Related Art

Virtual reality (VR) is generally considered to be a computer generated simulated environment in which a user has an apparent physical presence. A VR experience can be generated in 3D and viewed with a head-mounted display (HMD), such as glasses or other wearable display devices that have near-eye display panels as lenses to display a VR environment that replaces an actual environment.

Augmented reality (AR), however, enables an experience in which a user can still see through the display lenses of the glasses or other HMD device to view the surrounding environment, yet also see images of virtual objects that are generated for display and appear as part of the environment. AR can include any type of input, such as audio and haptic inputs, as well as virtual images, graphics, and video that enhances or augments the environment that the user experiences. In order to achieve an AR experience, a virtual image is overlaid on an ambient environment, with the overlaying performed by optical devices.

Multiple optical devices are fabricated on a substrate and then diced prior to use on VR and AR devices. Accordingly, there is a need for a method of laser dicing optical devices with a protective coating, and a protective coating for laser dicing optical devices.

SUMMARY

A method of dicing optical devices from an optical device substrate is provided. The method includes disposing a protective coating only over the optical devices. The optical device substrate includes the optical devices disposed on the surface of the optical device substrate with areas therebetween. The areas of the optical device substrate are exposed by the protective coating. The protective coating includes a polymer, a solvent, and an additive. The method further includes curing the protective coating via a cure process so that the protective coating is water-soluble after the solvent is removed by the cure process, dicing the optical devices from the optical device substrate by projecting a laser beam to the areas between the optical devices, and exposing the protective coating to water to remove the protective coating from the optical devices that are diced.

A method of dicing optical devices from an optical device substrate is provided. The method includes disposing a protective coating by inkjet deposition or screen printing deposition only over the optical devices. The optical devices have a plurality of optical device structures disposed thereon. The optical device substrate includes the optical devices disposed on the surface of the optical device substrate with areas therebetween. The areas of the optical device substrate are exposed by the protective coating. The protective coating includes a polymer, a solvent, and an additive. The method further includes curing the protective coating via a cure process so that the protective coating is water-soluble after the solvent is removed by the cure process, dicing the optical devices from the optical device substrate by projecting a laser beam to the areas between the optical devices, and exposing the protective coating to water to remove the protective coating from the optical devices that are diced.

A method of dicing optical devices from an optical device substrate is provided. The method includes disposing a protective coating by inkjet deposition or screen printing deposition only over the optical devices. The optical devices have a plurality of optical device structures disposed thereon. The optical device substrate includes the optical devices disposed on the surface of the optical device substrate with areas therebetween. The areas of the optical device substrate are exposed by the protective coating. The protective coating includes a polymer. The polymer includes at least one of a polyvinylpyrrolidone (PVP) containing material, a polypropylene containing material, polyvinyl acetate (PVA) containing material, or a combination thereof, a solvent, and an additive. The method further includes curing the protective coating via a cure process so that the protective coating is water-soluble after the solvent is removed by the cure process, dicing the optical devices from the optical device substrate by projecting a laser beam to the areas between the optical devices, and exposing the protective coating to water to remove the protective coating from the optical devices that are diced.

BRIEF DESCRIPTION OF THE DRAWINGS

So that the manner in which the above recited features of the disclosure can be understood in detail, a more particular description of the disclosure, briefly summarized above, may be had by reference to embodiments, some of which are illustrated in the appended drawings. It is to be noted, however, that the appended drawings illustrate only typical embodiments of this invention and are therefore not to be considered limiting of its scope, for the disclosure may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Embodiments of the present disclosure generally relate to optical devices. Specifically, embodiments of the present disclosure relate to a method of laser dicing optical devices with a protective coating, and a protective coating for laser dicing optical devices.

Figure 1A:
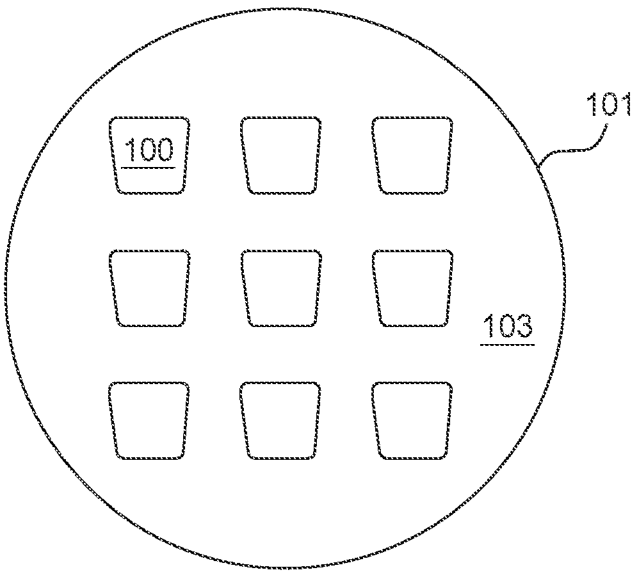
FIG. 1A is a perspective, frontal view of an optical device substrate according to embodiments described herein.

FIG. 1A is a perspective, frontal view of an optical device substrate 101. The optical device substrate 101 includes a plurality of optical devices 100 disposed on a surface 103 of the optical device substrate 101. The optical devices 100 are waveguide combiners utilized for virtual, augmented, or mixed reality. The optical device substrate 101 can be any substrate used in the art, and can be either opaque or transparent to a chosen laser wavelength depending on the use of the optical device substrate 101. Additionally, the optical device substrate 101 may be of varying shapes, thicknesses, and diameters. For example, the optical device substrate 101 may have a diameter of about 150 mm to about 300 mm. The optical device substrate 101 may have a circular, rectangular, or square shape. The optical device substrate 101 may have a thickness of between about 300 μm to about 1 mm. Although only nine optical devices 100 are shown on the optical device substrate 101, any number of optical devices 100 may be disposed on the surface 103.

Figure 1B:
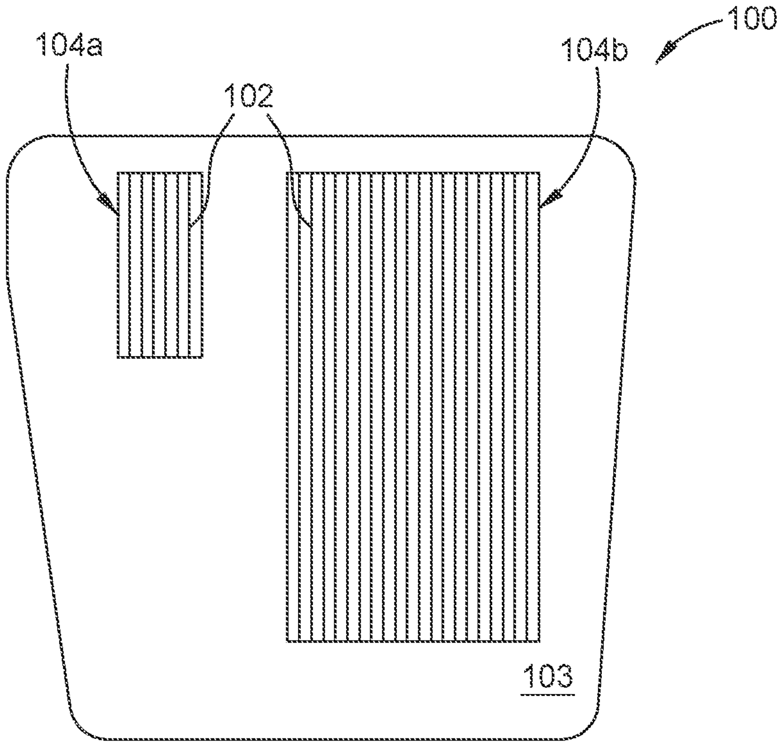
FIG. 1B is a perspective, frontal view of an optical device according to embodiments described herein.

FIG. 1B is a perspective, frontal view of an optical device 100. It is to be understood that the optical devices 100 described herein are exemplary optical devices and other optical devices may be used with or modified to accomplish aspects of the present disclosure. The optical device 100 includes a plurality of optical device structures 102 disposed on the surface 103 of the optical device substrate 101. The optical device structures 102 may be nanostructures having sub-micron dimensions, e.g., nano-sized dimensions. Regions of the optical device structures 102 correspond to one or more gratings, such as a first grating 104*a* and a second grating 104*b*. In some embodiments, which can be combined with other embodiments described herein, the optical device 100 includes at least the first grating 104*a* corresponding to an input coupling grating and the second grating 104*b* corresponding to an output coupling grating. The optical device structures 102 may have other shapes including, but not limited to, circular, triangular, elliptical, regular polygonal, irregular polygonal, and/or irregular shaped cross-sections.

Figure 3A:
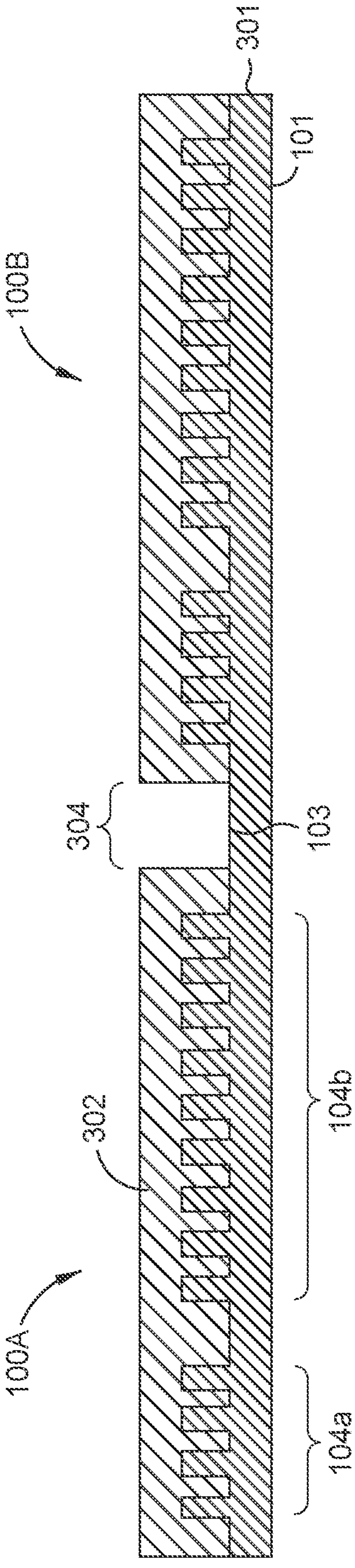
FIGS. 3A-3D are schematic, cross-sectional views of a portion of an optical device substrate during a method for dicing optical devices according to embodiments described herein.

After fabrication of the optical devices 100 on the optical device substrate 101, it is desirable to dice the optical device substrate 101 into individual optical devices. For example, as shown in FIG. 3D further described herein, a first optical device 100A and a second optical device 1006 are diced from the substrate into individual optical devices. In order to improve the quality of the optical devices 100 after dicing, contamination during the dicing process must be reduced. The method 200 described herein provides for dicing of the optical devices 100 with reduced contamination via the use of a water-soluble protective coating that is selectively deposited over the optical devices 100 prior to dicing.

Figure 2:
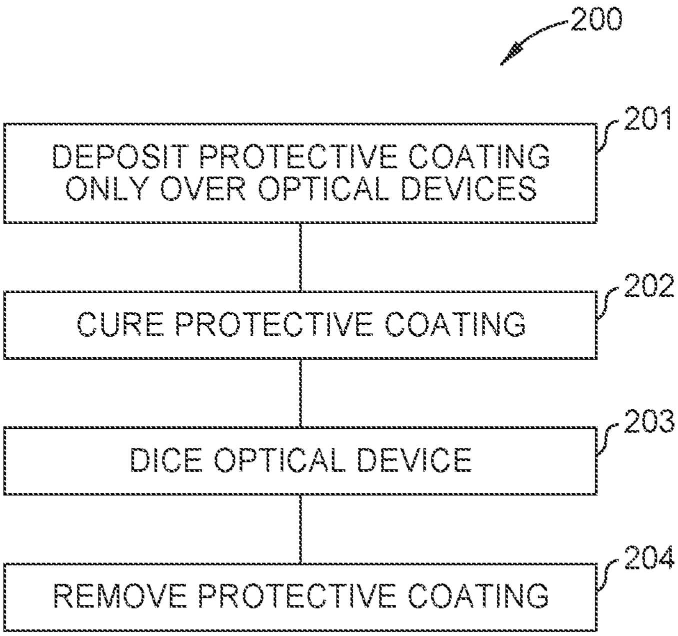
FIG. 2 is a flow diagram of a method for dicing optical devices according to embodiments described herein.

FIG. 2 is a flow a flow diagram of a method 200 for dicing optical devices 100 from the optical device substrate 101. FIGS. 3A-3D are schematic, cross-sectional views of a portion 301 of the optical device substrate 101 during the method 200. The portion 301 of the optical device substrate 101 corresponds to the first optical device 100A and the second optical device 100B to be diced from the optical device substrate 101.

At operation 201, a protective coating 302 is deposited only over the optical devices 100. Portions of the surface 103 of the optical device substrate 101 without the optical devices 100 are not coated with the protective coating 302. As shown in FIG. 3A, the protective coating 302 is deposited only on the first optical device 100A and the second optical device 1006. The protective coating 302 is deposited by inkjet deposition or screen printing deposition. Inkjet deposition or screen printing deposition provides for selective deposition of the protective coating 302 only on the optical devices 100. The protective coating 302 may reflect, refract, or diffract a laser beam during a laser dicing process. The reflection, refraction, or diffraction of the laser beam may lead to undesired laser dosage or other results causing areas 304 of the optical device substrate 101 without the optical devices 100 to not be completely removed. Deposition of the protective coating 302 only on the optical devices 100 allows the areas 304 of the optical device substrate 101 exposed by the protective coating 302 to be completely removed after a laser dicing process. Prior to curing, the protective coating 302 for inkjet printing has a viscosity of 0.5 centipoise (cP) to 200 cP at 25° C. Prior to curing, the protective coating 302 for screen printing has a viscosity of 1000 centipoise (cP) to 100000 cP at 25° C. Prior to curing, the protective coating 302 has a surface tension from 15 millinewton per meter (mN/m) to 90 mN/m.

The protective coating 302 includes a polymer, a solvent, and an additive. In some embodiments, the protective coating 302 further includes a photo curable material. The polymer includes at least one of a polyvinylpyrrolidone (PVP) containing material, a polypropylene containing material, a polyvinyl acetate (PVA) containing material, or a combination thereof. The PVP containing material includes at least one of a PVP polymer, a PVP copolymer, a PVP block copolymer, or a combination thereof. The polymer is hydrophilic and water-soluble. The hydrophilic and water-soluble polymer allows for the protective coating 302 to be soluble in water after the protective coating 302 is cured by UV radiation, thermal baking, or a combination thereof. Thermal baking is conducted at a temperature of 25° C. to 300° C. or less. The water may be deionized water or distilled water.

The photo curable material includes one or more monomers, cross-linkers, oligomers, photo initiators, or combinations thereof. The photo curable material cross-links into a water-soluble polymer network when the protective coating 302 is cured. A water-soluble polymer network allows for the protective coating 302 to be soluble in water. In some embodiments, the protective coating 302 is cured via a UV cure process or thermal baking process. The monomers include water-soluble acrylates, such as methacrylates, epoxies, or combinations thereof. The cross-linkers include water-soluble multi-functional acrylates, such as multi-functional acrylates, methacrylates, epoxies, or combinations thereof. The oligomers include water-soluble acrylates, methacrylates, epoxies, or combinations thereof. The additive includes one or more surfactants or one or more polymers.

The solvent includes an organic solvent and water. The organic solvent includes an ester, an ether, and an alcohol. The ester, the ether, and the alcohol have a boiling point less than or equal to 300° C. at 1 atm. The organic solvent includes di(propylene glycol) methyl ether (DPGME), Dipropylene glycol n-butyl ether (DPGBE), Tri(propylene glycol) methyl ether (TPGME), dipropylene glycol mono-n-propylether (DPGPE), dipropylene glycol dimethyl ether (DPGDME), tripropylene glycol (mono) n-butyl ether (TPGBE), propylene glycol butyl ether (PGBE), (2-(2-methoxyethoxy)ethanol (DEGME), 2-(2-ethoxyethoxy) ethanol (DEGEE), triethylene glycol monomethyl ether (TEGME), propylene glycol methyl ether (PGME), propylene glycol propyl ethe (PGPE), propylene glycol methyl ether acetate (PGMEA), dipropylene glycol monomethyl ether acetate (DPGMEA), ethanol, methanol, isopropanol, 1-butanol, 2-butanol, 1-pentanol, 2-pentanol, 3-pentanol, 1-hexanol, 2-hexanol, 3-hexanol, butyl acetate, butyl lactate, or combinations thereof. The solvent includes 0% to 80% water. The solvent allows for the protective coating 302 to be selectively deposited as an inkjet ink or screen printing ink. Upon curing the solvent is removed from the protective coating 302.

Figure 3B:
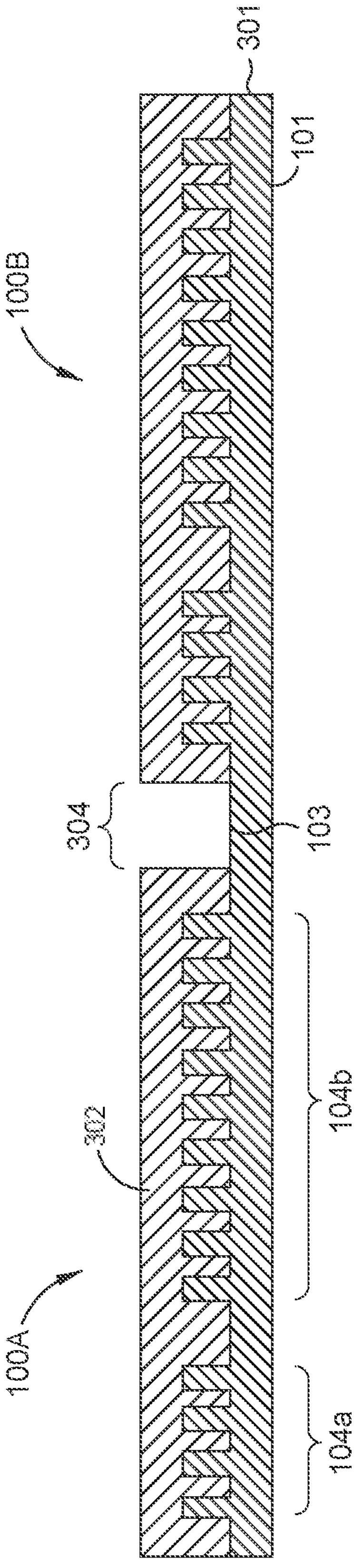
Figure 3C:
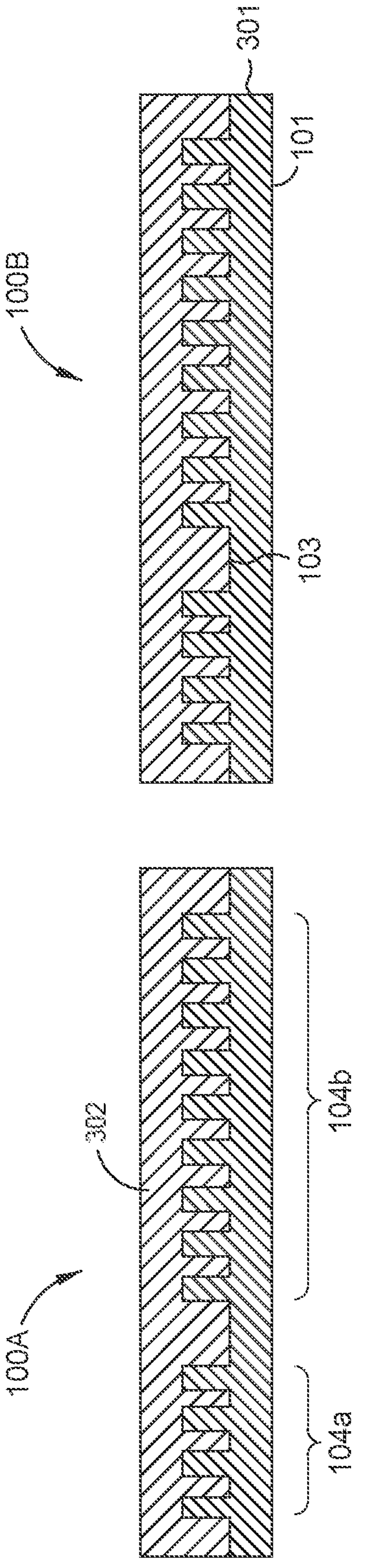
Figure 3D:
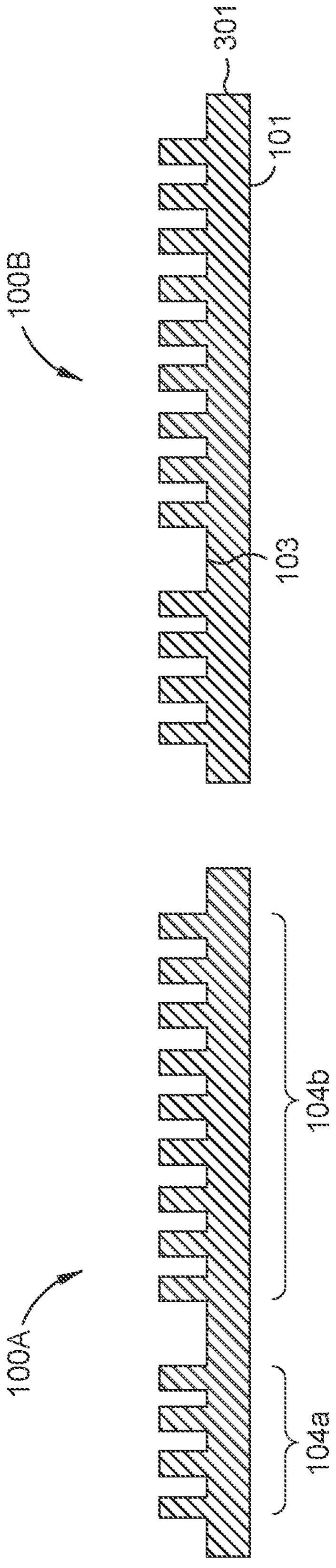

At operation 202, as shown in FIG. 3B, the protective coating 302 is cured. The protective coating 302 is cured via a bake process or UV cure process. Upon curing the solvent is removed from the protective coating 302. In some embodiments, the protective coating 302 is cured via a bake process. In other embodiments, the protective coating 302 is cured via a UV cure process. At operation 203, the optical devices 100 are diced. The areas 304 of the substrate the optical device substrate 101 exposed by the protective coating 302 are removed via a dicing process. The dicing process is a laser dicing process. During the laser dicing process a laser beam is projected to the areas 304. The areas 304 of the optical device substrate 101 exposed by the protective coating 302 are completely removed after the laser dicing process due to the deposition of the protective coating 302 only on the optical devices 100. As shown in FIG. 3C, the first optical device 100A and the second optical device 100B are diced from the portion 301 of optical device substrate 101 and the area 304 is removed.

At operation 204, the protective coating 302 is removed from the optical devices 100. As shown in FIG. 3D, the protective coating 302 is removed from the first optical device 100A and the second optical device 1008. The protective coating 302 is removed by exposure to water. The water may be deionized water or distilled water. As the protective coating 302 is water-soluble, removal of the protective coating 302 with water provides for aqueous waste. Organic waste generated from insoluble coatings, such as organic coatings, may contaminate the optical devices 100.

While the foregoing is directed to embodiments of the present disclosure, other and further embodiments of the disclosure may be devised without departing from the basic scope thereof, and the scope thereof is determined by the claims that follow.

What is claimed is:

1. A method of dicing waveguides from an optical device substrate, comprising:

disposing a protective coating over the waveguides, each waveguide having an input coupling grating comprising first optical device structures and an output coupling grating comprising second optical device structures, the optical device substrate comprising the waveguides disposed on a surface of the optical device substrate with areas therebetween, wherein the protective coating is selectively disposed to cover the waveguides while leaving areas between the waveguides exposed for laser dicing, the protective coating comprising:

a polymer;

a solvent, and an additive;

curing the protective coating via a cure process so that the protective coating is water-soluble after the solvent is removed by the cure process;

dicing the waveguides from the optical device substrate by projecting a laser beam to the areas between the waveguides such that the exposed areas are removed while the waveguides covered by the protective coating are protected during the laser dicing; and exposing the protective coating to water to remove the protective coating from the waveguides that are diced.

2. The method of claim 1, wherein the solvent comprises an organic solvent and water.

3. The method of claim 2, wherein the organic solvent includes an ester, an ether, and an alcohol.

4. The method of claim 3, wherein the ester, the ether, and the alcohol have a boiling point less than or equal to 300° C. at 1 atm.

5. The method of claim 3, wherein the organic solvent comprises di(propylene glycol) methyl ether (DPGME), dipropylene glycol n-butyl ether (DPGBE), Tri(propylene glycol) methyl ether (TPGME), dipropylene glycol mono-n-propylether (DPGPE), dipropylene glycol dimethyl ether (DPGDME), tripropylene glycol (mono) n-butyl ether (TPGBE), propylene glycol butyl ether (PGBE), (2-(2-methoxyethoxy) ethanol (DEGME), 2-(2-ethoxyethoxy) ethanol (DEGEE), triethylene glycol monomethyl ether (TEGME), propylene glycol methyl ether (PGME), propylene glycol propyl ethe (PGPE), propylene glycol methyl ether acetate (PGMEA), dipropylene glycol monomethyl ether acetate (DPGMEA), ethanol, methanol, isopropanol, 1-butanol, 2-butanol, 1-pentanol, 2-pentanol, 3-pentanol, 1-hexanol, 2-hexanol, 3-hexanol, butyl acetate, butyl lactate, or combinations thereof.

6. The method of claim 1, wherein the polymer comprises at least one of a polyvinylpyrrolidone (PVP) containing material, a polypropylene containing material, polyvinyl acetate (PVA) containing material, or a combination thereof.

7. The method of claim 6, wherein the PVP containing material comprises at least one of a PVP polymer, a PVP copolymer, a PVP block copolymer, or a combination thereof.

8. The method of claim 1, wherein the protective coating further comprises a photo curable material.

9. The method of claim 8, wherein the photo curable material comprises one or more monomers, cross-linkers, oligomers, photo initiators, or combinations thereof.

10. The method of claim 1, wherein the polymer is hydrophilic and water-soluble.

11. The method of claim 1, wherein the protective coating is deposited by inkjet deposition or screen printing deposition only over the waveguides.

12. A method of dicing waveguides from an optical device substrate, comprising:

disposing a protective coating by inkjet deposition or screen printing deposition over the waveguides, each waveguide having an input coupling grating comprising first optical device structures and an output coupling grating comprising second optical device structures disposed thereon, the optical device substrate comprising the waveguides disposed on a surface of the optical device substrate with areas therebetween, wherein the inkjet deposition or screen printing deposition deposits the protective coating on the waveguides and leaves the areas between the waveguides exposed for laser dicing, the protective coating comprising:

a polymer, wherein the polymer is hydrophilic and water-soluble;

a solvent, and an additive;

curing the protective coating via a cure process so that the protective coating is water-soluble after the solvent is removed by the cure process;

dicing the waveguides from the optical device substrate by projecting a laser beam to the areas between the waveguides such that the exposed areas are removed while the waveguides covered by the protective coating are protected during the laser dicing; and exposing the protective coating to water to remove the protective coating from the waveguides that are diced.

13. The method of claim 12, wherein the solvent comprises an organic solvent and water.

14. The method of claim 13, wherein the organic solvent includes an ester, an ether, and an alcohol.

15. The method of claim 14, wherein the ester, the ether, and the alcohol have a boiling point less than or equal to 300° C. at 1 atm.

16. The method of claim 13, wherein the organic solvent comprises di(propylene glycol) methyl ether (DPGME), dipropylene glycol n-butyl ether (DPGBE), Tri(propylene glycol) methyl ether (TPGME), dipropylene glycol mono-n-propylether (DPGPE), dipropylene glycol dimethyl ether (DPGDME), tripropylene glycol (mono) n-butyl ether (TPGBE), propylene glycol butyl ether (PGBE), (2-(2-methoxyethoxy)ethanol (DEGME), 2-(2-ethoxyethoxy) ethanol (DEGEE), triethylene glycol monomethyl ether (TEGME), propylene glycol methyl ether (PGME), propylene glycol propyl ethe (PGPE), propylene glycol methyl ether acetate (PGMEA), dipropylene glycol monomethyl ether acetate (DPGMEA), ethanol, methanol, isopropanol, 1-butanol, 2-butanol, 1-pentanol, 2-pentanol, 3-pentanol, 1-hexanol.

17. A method of dicing waveguides from an optical device substrate, comprising:

disposing a protective coating by inkjet deposition or screen printing deposition over the waveguides, each waveguide having an input coupling grating comprising first optical device structures and an output coupling grating comprising second optical device structures disposed thereon, the optical device substrate comprising the waveguides disposed on a surface of the optical device substrate with areas therebetween, wherein the protective coating covers the waveguides and leaves the areas between the waveguides exposed for laser dicing, the protective coating comprising:

a polymer, the polymer comprising at least one of a polyvinylpyrrolidone (PVP) containing material, a polypropylene containing material, polyvinyl acetate (PVA) containing material, or a combination thereof;

a solvent, and an additive;

curing the protective coating via a cure process so that the protective coating is water-soluble after the solvent is removed by the cure process;

dicing the waveguides from the optical device substrate by projecting a laser beam to the areas between the waveguides such that the exposed areas are removed while the waveguides covered by the protective coating are protected during the laser dicing; and exposing the protective coating to water to remove the protective coating from the waveguides that are diced.

* * * * *